United States Patent [19]

Barron et al.

[11] Patent Number: 4,507,443

[45] Date of Patent: Mar. 26, 1985

[54] SEALANT AND COATING COMPOSITION

[75] Inventors: Larry R. Barron, Mentor; Pao-Chi Wang, Strongsville, both of Ohio

[73] Assignee: The B. F. Goodrich Company, Akron, Ohio

[21] Appl. No.: 582,681

[22] Filed: Feb. 23, 1984

[51] Int. Cl.³ ............................................ C08F 283/04
[52] U.S. Cl. ........................................ 525/453; 528/28
[58] Field of Search ........................... 528/28; 525/453

[56] References Cited

U.S. PATENT DOCUMENTS

| | | | |
|---|---|---|---|
| 3,248,371 | 4/1966 | Damusis | 528/48 |
| 3,267,078 | 8/1966 | Damusis | 528/48 |
| 3,627,722 | 12/1971 | Seiter | 528/48 |
| 4,067,844 | 1/1978 | Barron et al. | 525/453 |
| 4,345,053 | 8/1982 | Rizk et al. | 528/17 |
| 4,374,237 | 2/1983 | Berger et al. | 528/38 |

*Primary Examiner*—Melvyn I. Marquis
*Attorney, Agent, or Firm*—James R. Lindsay

[57] ABSTRACT

A sealant or coating composition is described that is comprised of (a) a blocked isocyanate-terminated prepolymer in which essentially all NCO groups are blocked, (b) a multi-functional imine essentially free of any amine functionality formed by the reaction between a primary multi-functional amine with a ketone or aldehyde, and (c) from 0.1 to 10 parts by weight of an organosilane based upon 100 parts by weight of the blocked isocyanate-terminated prepolymer.

9 Claims, No Drawings

SEALANT AND COATING COMPOSITION

BACKGROUND OF THE INVENTION

The present invention relates to a sealant and coating composition and pertains more particularly to curable one-part blocked isocyanate-terminated polymeric compositions that are useful as caulking sealants and coating compositions.

Sealant and coating compositions desirably have a combination of properties which render them particularly suitable for their intended applications. Such compositions should be able to be packaged in sealed containers or cartridges and stored for relatively long periods of time without objectionably "setting up" or hardening (as a result of cross-linking). When applied as a caulking sealant or coating composition, they should form a relatively tack-free surface soon after being applied and exposed to atmospheric moisture and should cure without the formation of bubbles within an acceptable time period. They should adhere tenaciously in the cured state to a wide variety of surfaces, such as to glass, aluminum, concrete, marble and steel surfaces. The sealant or coating in the cured state should have sufficient elasticity and flexibility to withstand expansions and contractions of panels, etc. with which it is associated during temperature variations experienced as a result of climatic changes and to withstand wind forces that cause panels with which it is associated to flex or twist.

Various sealant compositions have been proposed heretofore:

U.S. Pat. No. 3,248,371, the disclosure of which is incorporated herein by reference, is directed to a blocked isocyanate-terminated urethane coating composition formed by reacting an isocyanate-terminated polyether-based urethane intermediate with a hydroxy tertiary amine.

U.S. Pat. No. 3,267,078, the disclosure thereof being incorporated herein by reference, pertains to a coating composition that contains a blocked isocyanate-terminated polyether-based urethane intermediate and a diimine prepared by reacting a diamine with a carbonyl compound such as a ketone or aldehyde.

U.S. Pat. No. 3,445,436, the disclosure thereof being incorporated herein by reference, discloses polyurethane polyepoxide compositions formed by reacting a polyester or polyether triol, with or without a minor proportion of a diol material blended therewith, with a polyisocyanate to produce a liquid polyurethane prepolymer material, the liquid polyurethane prepolymer then being reacted with glycidol or a 2-alkyl glycidol (such as 2-methyl glycidol or 2-ethyl glycidol) to form the polyurethane polyepoxide. The polyurethane polyepoxide compositions can be cross-linked by the addition of an organic polyamine.

U.S. Pat. No. 3,627,722, the disclosure thereof being incorporated herein by reference, describes a sealant composition formed by the reaction of an isocyanate-terminated polyurethane prepolymer with a trialkyloxysilane such as N-methylaminopropyltrimethoxysilane.

U.S. Pat. No. 3,632,557, the disclosure thereof being incorporated herein by reference, discloses reacting an isocyanate-terminated polyurethane prepolymer with a trifunctional organosilicon compound such as gamma-aminopropyltrimethoxysilane. A stoichiometric excess of the aminosilane is used.

U.S. Pat. No. 3,309,261, the disclosure of which is incorporated herein by reference, discloses the addition of an aminosilane to a polyurethane adhesive to improve the adhesive's lap shear strength and peel strength.

U.S. Pat. No. 3,372,083, the disclosure thereof being incorporated herein by reference, describes the use of a bituminous material that has been reacted with a polyisocyanate in combination with a polyurethane prepolymer.

U.S. Pat. No. 4,067,844, the disclosure thereof being incorporated herein by reference, describes a one-part polyurethane sealant composition formed by preparing an isocyanate-terminated polyurethane prepolymer and then reacting a minor proportion of the NCO terminates with specified aminosilane materials or the reaction product of a mercaptosilane with a monoepoxide or the reaction product of an epoxysilane with a secondary amine.

SUMMARY OF THE INVENTION

In accordance with the present invention, a one-part sealant or coating composition is provided that comprises (a) a blocked isocyanate-terminated prepolymer in which essentially all (desirably at least 90 percent) NCO groups are blocked, (b) a multi-functional imine essentially free of any amine functionality formed by the reaction between a primary multi-functional amine with a ketone or aldehyde, and (c) from 0.1 to 10 parts by weight of an organosilane based upon 100 parts by weight of said blocked isocyanate-terminated prepolymer. Sealants or coating compositions of the present invention are moisture curable compositions that adhere tenaciously to a wide variety of surfaces, form tack-free surfaces after being exposed to the atmosphere for only a short period of time and form a sealing cure within a matter of hours after being applied.

DETAILED DESCRIPTION OF THE INVENTION

The blocked isocyanate-terminated prepolymer used in the present invention can be represented by the following structural formula:

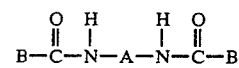

where A is a backbone polymer component and B is an isocyanate-blocking radical produced by the reaction of a blocking agent with an isocyanate terminate group.

The isocyanate-terminated backbone prepolymer may be formed by reacting any hydroxyterminated polymeric material with a di -or triisocyanate. Desirably the hydroxy-terminated polymer has an average molecular weight of about 1,000 to 18,000. Typical hydroxy-terminated polymers include hydroxy-terminated polyesters, polyether triols, hydroxy-terminated urethanes and hydroxy-terminated polybutadienes. The triols can be blended with a minor amount of a diol material, desirably having an average molecular weight of at least about 1000, although preferably only triols are used.

Suitable polyether diols and triols include polyethylene ether diols or triols, polypropylene ether diols or triols polybutylene ether diols or triols, polytetramethylene ether diols or triols, and block copolymers of such diols and triols.

Suitable hydroxy-terminated polyesters include any hydroxy-terminated polyester prepared from poly-basic acids or anhydrides (for example, adipic acid and phthalic anhydride) and polyols in which the hydroxyl functionality of the polyester prepolymer is greater than 2, preferably over 2.3.

The di- or triisocyanates that can be reacted with the hydroxy-terminated backbone polymer are organic isocyanates having 2 or more isocyanate groups or a mixture of such organic isocyanates. Suitable di -or triisocyanates include p,p',p''-triisocyanato triphenyl methane, p,p'-diisocyanato diphenyl methane, hexamethylene diisocyanate, naphthalene-1,5-diisocyanate, 2,4-tolylene diisocyanate, 2,6-tolylene diisocyanate, and mixtures thereof.

The isocyanate-terminated backbone prepolymer may be prepared merely by mixing the hydroxy-terminated polymer and isocyanate together at ambient temperature and pressure, although the speed of the reaction is significantly increased if the temperature of the reaction mixture is raised to a higher temperature, for example, a temperature between 60°–100° C. A slight stoichiometric excess of the polyisocyanate is used to insure as complete a reaction of the terminate hydroxy groups of the polymer with isocyanate as practical.

In order to provide a polymer that is more stable during storage, the isocyanate-terminated prepolymer described above is "blocked" with a blocking agent that reacts with the isocyanate terminate groups of the prepolymer. Blocking agents useful in the present invention include any of the conventional blocking agents that produce blocked isocyanate terminates that do not react readily with the moisture in air at room temperature (25° C.), but which will "unblock" and be replaced with a curative for isocyanate-terminated polymers at room temperature. Such blocking agents include phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 1-hydroxy-2-propanone, 3-hydroxyacetophenone, 4-hydroxyacetophenone, ethyl acetyl acetate and cyclohexanone oxime. Sufficient blocking agent is reacted with the isocyanate-terminated polymer to theoretically "block" all of the isocyanate terminates of the polymer.

The multi-functional imine curative component of the sealant or coating composition is formed by the reaction of a primary multi-functional amine, desirably having a functionality of from 2 to 4, with a ketone or aldehyde. The multi-functional imine may be represented by the formula:

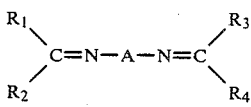

wherein $R_1$, $R_2$, $R_3$, and $R_4$ are radicals each independently selected from the group consisting of hydrogen, an alkyl having from 1 to 10 carbon atoms and phenyl and wherein A may be any radical having a molecular weight from 26 to 7000. Preferably the multi-functional imine is a ketimine formed by the reaction of a primary di- or triamine with a ketone. $R_1$, $R_2$, $R_3$ and $R_4$ may be the same or different. The curative can be prepared by refluxing the primary amine and ketone or aldehyde together in the presence of an azeotroping agent such as benzene, toluene or xylene. Suitable curatives that can be prepared by the above procedure and are useful in the sealant or coating composition of this invention are 1,2-ethylene bis(isopentylidene imine), 1,2-hexylene bis(isopentylidene imine), 1,2-propylene bis(isopentylidene imine), p,p'-bisphenylene bis(isopentylidene imine), 1,2-ethylene bis(isopropylidene imine), 1,3-propylene bis(isopropylidene imine, p-phenylene bis(isopentylidene imine), m-phenylene bis(isopropylidene imine), and 1,5-naphthylene bis(isopropylidene imine). Since the multi-functional amine curative should be free of any amine functionality, stoichiometric quantities of the ketone or aldehyde and primary amine desirably are used in forming the curative. Any unreacted amine that may be present in the multi-functional imine curative component should be "neutralized" by reacting the unreacted amine with, for example, a diisocyanate compound or an epoxide such as an epoxysilane.

The organosilane included in the sealant or coating composition of the present invention serves a dual purpose, namely, (1) to react with (and thus "neutralize") any isocyanate terminates which were not blocked when the isocyante-terminated prepolymer was reacted with blocking agent or which were formed due to de-blocking of any previously blocked isocyanate groups on the polymer, and (2) to serve, in combination with the multi-functional imine curative, as a curative for the sealant or coating composition. The organosilanes useful in the present invention include aminosilanes, the reaction product of a mercaptosilane with a monoepoxide, the reaction product of an epoxysilane with a secondary amine or the reaction product of an aminosilane with an acrylic monomer. Suitable aminosilanes for use in the present invention include aminoalkylalkoxysilanes such as gamma-aminopropyltriethoxysilane, gamma-aminopropyltrimethoxysilane, gamma-aminopropylmethyldiethoxysilane and gamma-aminopropylmethyldimethoxysilane, and the reaction products of aminoalkylalkoxysilanes (such as gamma-aminopropyltrimethoxysilane and gamma-aminopropyltriethoxysilane) with ethyl acrylate, butyl acrylate, 2-ethylhexyl acrylate, cellosolve acrylate, methyl methacrylate, butyl methacrylate, 2-cyanoethyl acrylate, glycidyl acrylate and acrylonitrile. The reaction product of a mercaptosilane with a monoexpoxide include, for example, the reaction products of gamma-mercaptopropyl-trimethoxysilane or gamma-mercaptopropyltriethoxysilane with butylene oxide or styrene oxide. An example of a reaction product of an epoxysilane (such as an epoxyalkylalkoxysilane with a secondary amine) is the reaction product of gamma-glycidoxypropyltrimethoxysilane with di-n-butyl amine.

In addition to the aforesaid components of the sealant or coating composition, the composition may also include other conventional compounding ingredients such as fillers, thixotropic agents, extenders, pigments, etc. Since the presence of moisture in the composition is undesirable, any additives to the composition should be essentially free of moisture.

When the composition is to be used as a protective coating composition, a solvent material, for example, toluene, benzene, xylene, hexane or heptane, generally is added to provide a coating composition having a consistency suitable for application by spraying or brushing onto the surface to be coated.

A sealant or coating composition formulation within the scope of the present invention may be as follows:

| Material | Parts by Weight |
| --- | --- |
| Blocked isocyanate-terminated polymers | 100.0 |
| Multi-functional imine curative | 2.0 to 100.0 |
| Organosilane | 0.1 to 1.5 |
| Filler | 10.0 to 70.0 |
| Thixotropic agent | 10.0 to 16.0 |
| Solvent | 1.0 to 40.0 |

As explained above, the organosilane component of the sealant and coating composition of the present invention serves more than one function. During storage of the sealant or coating composition, it will react with any unblocked isocyanate terminate on the blocked isocyanate-terminated polymer of the composition or with any isocyanate terminate which may be formed as a result of a blocked isocyanate on the polymer becoming unblocked and, after the composition is applied as a sealant or coating, it will function as a curative to insure curing of the composition within an acceptably short period of time. In addition, the silane terminates on the polymer (resulting from reaction of the organosilane with isocyanate groups on the polymer) can react with moisture in the atmosphere and provide silane cross-link cites, thus facilitating the cure. Desirably, the amount of organosilane added to the composition is an amount to provide 1 to 40, preferably from 10 to 30, equivalent percent of silane groups based upon the available isocyanate groups on the prepolymer before blocking.

The multi-functional imine component also serves as a curative for the composition after the composition has been applied as a sealant or coating and is exposed to the atmosphere. The moisture in the atmosphere is preferentially drawn to the imine, instead of to the blocked isocyanate polymer in the sealant or coating, and reacts with the imine, resulting in reforming the primary amine and ketone or aldehyde from which the imine originally was produced. The freed primary amine then will react with the blocked isocyanate terminates to displace the blocking radical to produce curing through urea cross-linking. Desirably, the imine used in the sealant or coating composition has an equivalent functionality of between 0.3 to 2.5 with respect to the isocyanate terminate groups of the isocyanate-terminated prepolymer.

The invention will be further illustrated by the following examples.

EXAMPLE I

A blocked isocyanate-terminated polymer was formed according to the following procedure:

4130 parts by weight of a polypropylene ether triol having an average molecular weight of 6200 was admixed with 500 parts by weight of toluene and vacuum distilled to 160° C. at 15 mm of mercury to free the triol of moisture. After cooling the mixture to 60° C. while stirring the triol under a nitrogen atmosphere, 348 parts by weight of an 80/20 weight percent mixture of 2,4-tolylene diisocyanate and 2,6-tolylene diisocyanates were added. The resulting mixture was heated to 90° C. and held at that temperature for 2½ hours, to form the isocyanate-terminated polymer. 248 parts by weight of 3-methoxyphenol (a blocking agent) then were added to the mixture and the mixture was heated to 120° C. and maintained at that temperature for 3 hours. 2.5 parts by weight of dibutyl tin dilaurate (a catalyst for promoting blocking of the isocyanate-terminated polymer) were added to the mixture and the mixture was maintained at 120° C. for an additional 2 hours. The resultant reaction product was a blocked isocyanate-terminated polyurethane polymer having an equivalent weight of about 2400.

A ketimine curative was formed by mixing together 3246 parts by weight of a polyoxypropylene diamine having a molecular weight of about 400 (Jeffamine D-400 produced by Texaco Chemical Company), and 4545 parts by weight of methylisobutyl ketone in a Myers mixer. The contents were stirred in the mixer under a nitrogen atmosphere and 4.3 parts by weight of para-toluene sulfonic acid (a catalyst) were added. The mixture was heated to 120° C. and refluxed until the reaction was complete. Water formed as a product of the reaction was azeotropically removed as it was formed. The reaction product remaining in the mixer was cooled to 60° C. The nitrogen atmosphere was removed and the excess ketone was recovered by vacuum distillation. 104 parts by weight of methyltrimethoxysilane were added to the ketimine reaction product. The mix was allowed to cool to about 40° C. and 188 parts by weight of 2,2,4-trimethylhexamethylene diisocyanate were added to the mix.

A sealant composition was prepared by mixing together 2200 liters of the above-described blocked isocyanate-terminated polymer, 360 kilograms of a thixotropic agent (Thixcin R produced by NL Industries, Inc.) and 975 kilograms of dried calcium carbonate (filler). After the charge was mixed for 10 minutes, 79 kilograms of methyltrimethoxysilane and 20 kilograms of methyl alcohol were added to the charge. Mixing was continued for 1 hour. 22.56 kilograms of aminopropyltrimethoxysilane, 87.5 kilograms of processing oil (Sunthene 311 produced by Sun Oil Company) and a triarylphosphate plasticizer then were added to the charge. Mixing was continued for 20 minutes under a vacuum of 38 cm of mercury. Thereafter, 192 kilograms of the ketimine reaction product were added to the mix and mixing under a vacuum of 38 cm of mercury was continued for 15 minutes. The resulting sealant composition was loaded into caulking cartridges. The sealant had not objectionably deteriorated after being stored for six months at 25° C. in an atmosphere having a relative humidity of 50%.

EXAMPLE II

A sealant composition was formed according to the following formulation by the procedure set forth in Example I:

| Material | Parts By Weight |
| --- | --- |
| Blocked isocyanate-terminated polymer (of Example I) | 100.0 |
| Thixotropic agent (Thixcin R) | 15.7 |
| Filler (Calofort S - calcium stearate coated calcium carbonate) | 42.5 |
| Colorant | 7.5 |
| Aminopropyltriethoxysilane | 1.0 |
| Methyltrimethoxysilane | 3.5 |
| Methanol | .88 |
| Processing oil (Sunthene 311) | 3.9 |
| Tricresyl phosphate | 15.9 |
| Ketimine (of Example I) | 8.5 |

The sealant showed excellent stability upon being stored in sealed containers and developed a Shore A hardness of 31 after being exposed for 3 weeks to a 50 percent relative humidity atmosphere at 25° C.

EXAMPLE III

A sealant composition was formed according to the following formulation by the procedure described in Example I:

| Material | Parts By Weight |
| --- | --- |
| Blocked isocyanate-terminated polymer (of Example I) | 100.0 |
| Thixotropic agent (Thixcin R) | 15.7 |
| Plasticizer (dipropylene glycol-dibenzoate) | 24.9 |
| Processing oil (Sunthene 311) | 3.86 |
| Colorant | 7.52 |
| Filler (Hakuenka CC - calcium stearate coated calcium carbonate) | 64.0 |
| Methyltrimethoxysilane | 4.56 |
| Methanol | .89 |
| Ketimine (of Example I) | 10.0 |
| Gamma-aminopropyltrimethoxysilane | .25 |

The sealant exhibited excellent stability upon being stored in sealed containers and developed a Shore A hardness of 40 and an ultimate elongation of 570 percent after being exposed for three weeks to a 50 percent relative humidity atmosphere at 25° C.

EXAMPLE IV

A sealant was made having the same composition as Example III except that 1.0 part of gamma-aminopropyltrimethoxysilane was used, rather than 0.25 part as used in Example III. The sealant showed excellent stability upon being stored in sealed containers and developed a Shore A hardness of 45 after being exposed for three weeks to a 50 percent relative humidity atmosphere at 25° C. No cracks were formed in the sealant upon being exposed to ultra violet radiation in a xenon weatherometer for 500 hours.

EXAMPLE V

A sealant was made having the same composition as Example III except that 0.5 part of gamma-aminopropylmethyldiethoxysilane was used in place of the 0.25 part of gamma-aminopropyltrimethoxysilane used in the composition of Example III. The sealant exhibited excellent stability upon being stored in sealed containers and developed a Shore A hardness of 38 after being exposed for three weeks to a 50 percent relative humidity atmosphere at 25° C. No cracks were formed in the sealant upon being exposed to ultra violet radiation in a xenon weatherometer for 500 hours.

EXAMPLE VI

A sealant was made having the same composition as Example II except that 78.9 parts by weight of a ketimine made using polyoxypropylene diamine having an average molecular weight of 2000 (Jeffamine D-2000 produced by Texaco Chemical Co.) was used in place of the ketimine used in Example II. The sealant had good shelf stability and cured to a Shore A hardness of 20 after being exposed to a 50 percent relative humidity atmosphere at 25° C. for three weeks.

EXAMPLE VII

A sealant was made having the same composition as Example II except that 7.7 parts by weight of a ketimine made using 1,3-diaminopropane was substituted for the ketimine used in Example II. The sealant had good shelf stability and cured to a Shore A hardness of 45 after being exposed for three weeks to a 50 percent relative humidity atmosphere at 25° C.

The sealant and coating compositions of the present invention provide compositions that have excellent storage stability in sealed containers, that have excellent flowability characteristics that enable them to be packaged as caulking sealants in cartridges that can be used in caulking guns, that have good flexibility and do not shrink objectionably upon curing, and that form a tack-free surface relatively soon after the exposure to the atmosphere.

We claim:

1. A sealant or coating admixture comprised of (a) a blocked isocyanate-terminated polymer in which essentially all NCO groups are blocked, (b) a multi-functional imine essentially free of amine functionality formed by the reaction between a primary multi-functional amine with a ketone or aldehyde, said multi-functional imine having the formula

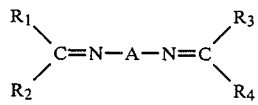

wherein $R_1$, $R_2$, $R_3$, and $R_4$ are radicals each independently selected from the group consisting of hydrogen, an alkyl having from 1 to 10 carbon atoms and phenyl and wherein A is a radical having a molecular weight from 26 to 7000, and (c) from 0.1 to 10 parts by weight of an organosilane based upon 100 parts by weight of said blocked isocyanate-terminated polymer, said organosilane being selected from the group consisting of aminosilanes, the reaction product of a mercaptosilane with a monoepoxide, the reaction product of an epoxysilane with a secondary amine, and the reaction product of an aminosilane with an acrylic monomer.

2. The admixture of claim 1 wherein said blocked isocyanate-terminated polymer is the reaction product formed by reacting a hydroxy-terminated polymeric material having an average molecular weight of from 1,000 to 18,000 with a diisocyanate or triisocyanate to form an isocyanate-terminated prepolymer and thereafter reacting said isocyanate-terminated prepolymer with a blocking agent selected from the group consisting of phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 1-hydroxy-2-propanone, 3-hydroxy-acetophenone, 4-hydroxyaceto-phenone, ethyl acetyl acetate and cyclohexanone oxime.

3. The admixture of claim 2 wherein said blocking agent is nonylphenol.

4. The admixture of claim 1 wherein said admixture contains from 10 to 70 parts by weight of a filler per 100 parts by weight of said blocked isocyanate-terminated polymer.

5. The admixture of claim 1 wherein said admixture contains from 1 to 40 parts by weight of a solvent for said blocked isocyanate-terminated polymer.

6. The admixture of claim 1 wherein said multi-functional imine is a ketimine formed by the reaction of a primary diamine or triamine with a ketone.

7. The admixture of claim 1 wherein said isocyanate is a mixture of 2,4-tolylene diisocyanate and 2,6-tolylene diisocyanate.

8. The admixture of claim 1 wherein said blocked isocyanate-terminated polymer is a blocked isocyanate-terminated polyurethane polymer.

9. The admixture of claim 2 wherein said hydroxy-terminated polymer is a hydroxy-terminated polyether triol.

* * * * *